(12) United States Patent
Den Hoed

(10) Patent No.: US 6,877,505 B1
(45) Date of Patent: Apr. 12, 2005

(54) GRILL AND VEHICLE ATTACHMENT

(76) Inventor: John A. Den Hoed, 4502 Tiffany Dr., Kannapolis, NC (US) 28081

(\*) Notice: Subject to any disclaimer, the term of this patent is extended or adjusted under 35 U.S.C. 154(b) by 6 days.

(21) Appl. No.: 10/177,301

(22) Filed: Jun. 21, 2002

(51) Int. Cl.$^7$ .............................. F24C 1/16; F24C 3/14
(52) U.S. Cl. ...................................... 126/276; 126/30
(58) Field of Search ................ 126/276, 30, 25 R; 108/44; 224/519; 248/231.21, 352; 280/502

(56) References Cited

U.S. PATENT DOCUMENTS

| | | |
|---|---|---|
| 3,032,783 A | 5/1962 | Swanson, Jr. |
| 3,060,920 A | 10/1962 | Dibert |
| 4,518,189 A | 5/1985 | Belt |
| 5,029,935 A | 7/1991 | Dufrancatel |
| 5,263,467 A | 11/1993 | Jones |
| 5,472,164 A | 12/1995 | Contee, Jr. |
| 5,626,126 A * | 5/1997 | McNulty .................... 126/276 |
| 5,640,949 A | 6/1997 | Smith |
| 6,062,451 A * | 5/2000 | Lassanske et al. .......... 224/502 |
| 6,070,926 A * | 6/2000 | Hardin ..................... 296/26.08 |
| 6,152,341 A | 11/2000 | Lemay et al. |
| D449,269 S | 10/2001 | Gower |
| 6,354,286 B1 * | 3/2002 | Davis .......................... 126/276 |
| 6,460,745 B1 * | 10/2002 | Weaver ...................... 224/519 |
| 2001/0042545 A1 * | 3/2001 | Robin ......................... 126/276 |
| 2002/0148940 A1 * | 10/2002 | Lee ............................. 248/352 |

FOREIGN PATENT DOCUMENTS

GB 2 258 200 * 2/1993

\* cited by examiner

*Primary Examiner*—Alfred Basichas
(74) *Attorney, Agent, or Firm*—Leonard + Proehl, Prof. L.L.C.

(57) ABSTRACT

A the grill and vehicle attachement for attaching and positioning a grill to a vehicle. The the grill and vehicle attachement includes an attachment assembly being designed for being coupled to a vehicle. An accessory assembly is selectively coupled to the attachment assembly. The attachment assembly permits selective positioning of the accessory assembly with respect to the vehicle whereby the accessory assembly is usable by a user.

18 Claims, 7 Drawing Sheets

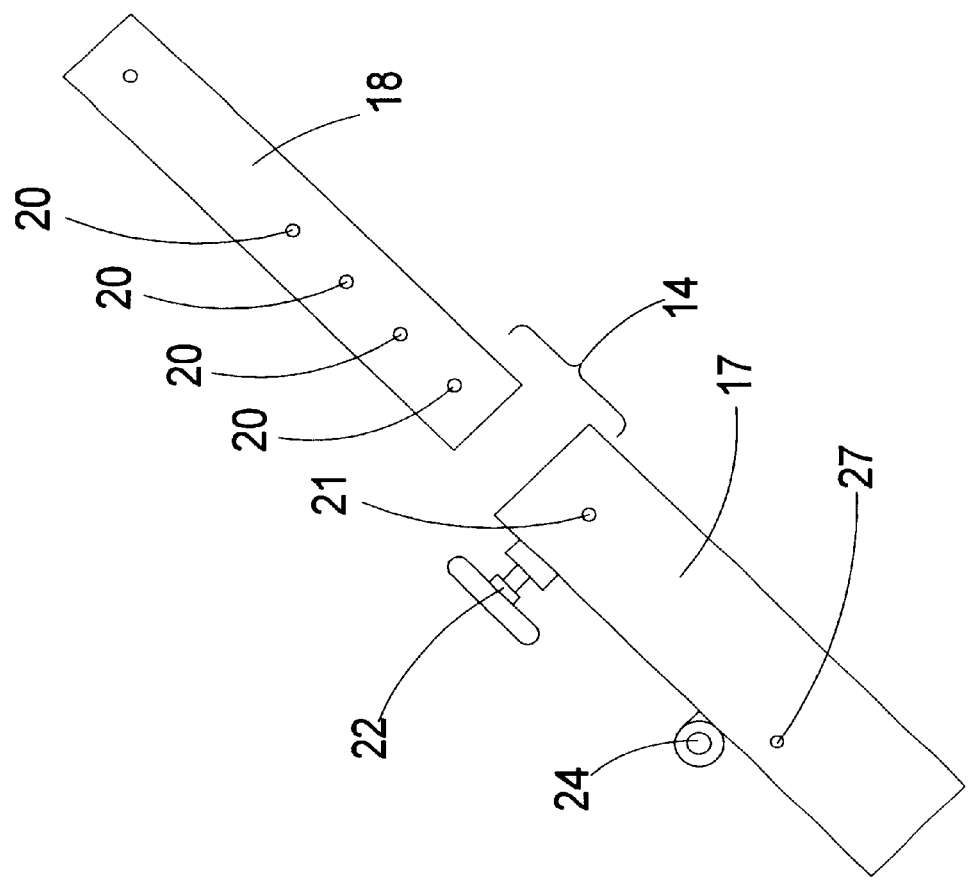
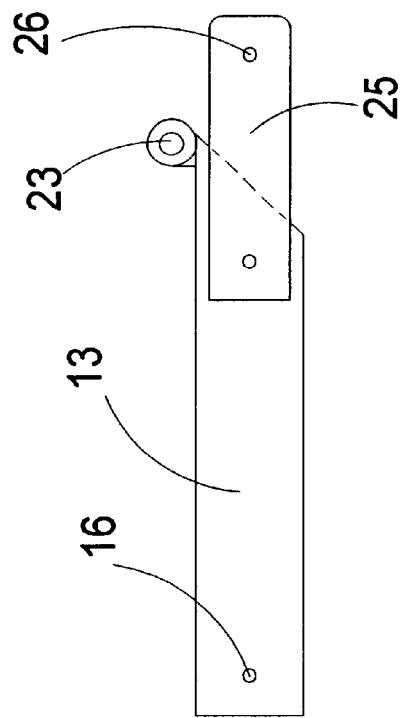
Fig. 3

US 6,877,505 B1

GRILL AND VEHICLE ATTACHMENT

BACKGROUND OF THE INVENTION

1. Field of the Invention

The present invention relates to gas grill assemblies and more particularly pertains to a new the grill and vehicle attachement for attaching and positioning a grill to a vehicle.

2. Description of the Prior Art

The use of gas grill assemblies is known in the prior art. U.S. Pat. No. 5,263,467 describes a system for attaching and horizontally positioning a gas grill to a vehicle. Another type of gas grill assembly is U.S. Pat. No. 5,029,935 having a linkage system coupled between a piece of furniture and a vehicle to allow the piece of furniture to be positioned with respect to the vehicle. U.S. Pat. Nos. 4,518,189, 5,640,949 and 6,152,341 each have an assembly for positioning an article with respect to a vehicle. U.S. Pat. No. 3,060,920 has a barbecue the is mountable to a vehicle. U.S. Pat. No. 5,472,164 has a bracket for securing a grill to a railing. U.S. Pat. Nos. Des. 449,269 and 3,032,783 have a support for mounting a portable grill to a vehicle. U.S. Pat. Nos. 5,626,126, 6,293,451, 4,381,069, 5,938,092, 5,950,617, 4,318,501, 4,729,535, 6,082,269 and 6,189,458 each have a system for coupling an accessory to a vehicle.

While these devices fulfill their respective, particular objectives and requirements, the need remains for a device that has certain improved features allowing for the adjustment of the height and the angle of the accessory with respect to vehicle.

SUMMARY OF THE INVENTION

The present invention meets the needs presented above by providing an arm portion pivotally coupled to an base portion so that the arm portion is pivoted to position the accessory assembly at a desired angle away from the vehicle with the length of the arm portion being adjustable to position the accessory assembly at a desired height.

Still yet another object of the present invention is to provide a new the grill and vehicle attachement that allows the accessory assembly to be positioned at an angle to compensate for the vehicle being positioned on an angled surface.

Even still another object of the present invention is to provide a new the grill and vehicle attachement that is easily disassembled to facilitate storage.

To this end, the present invention generally comprises an attachment assembly being designed for being coupled to a vehicle. An accessory assembly is selectively coupled to the attachment assembly. The attachment assembly permits selective positioning of the accessory assembly with respect to the vehicle whereby the accessory assembly is usable by a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded side view of the attachment assembly of the present invention.

DESCRIPTION OF THE PREFERRED EMBODIMENT

Figure 1:
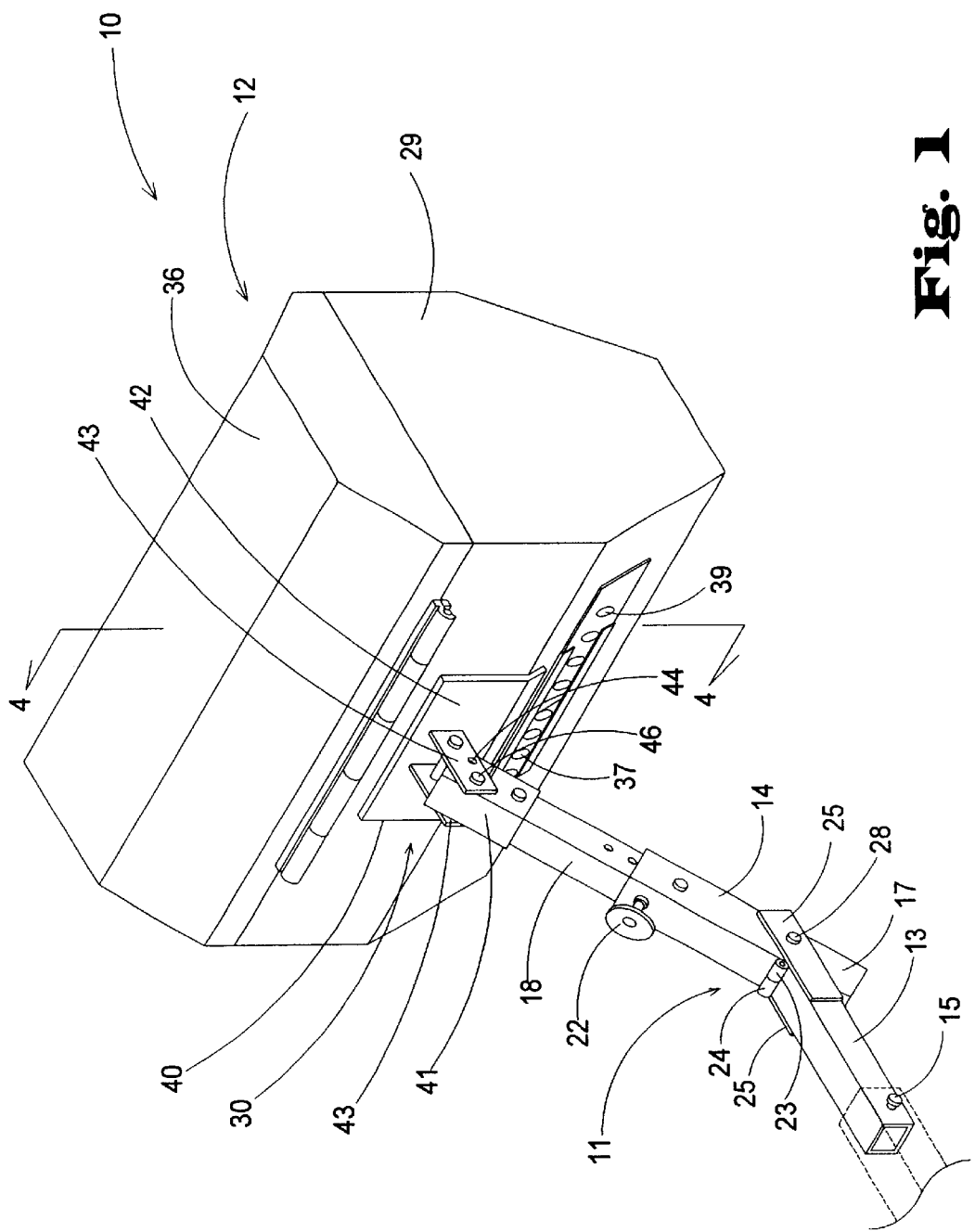
FIG. 1 is a perspective view of a new the grill and vehicle attachement according to the present invention coupled to a receiver of a vehicle.
Figure 2:
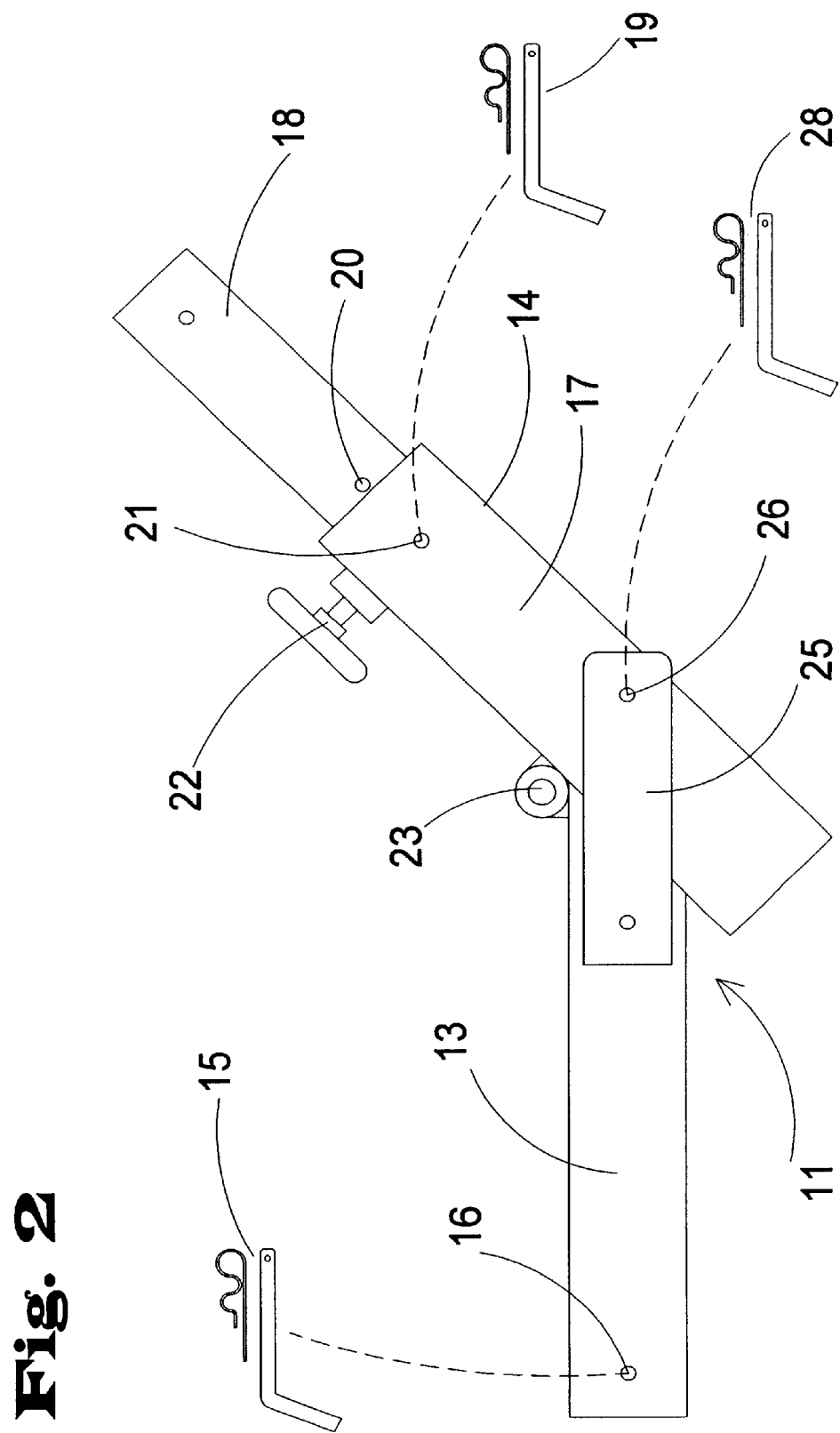
FIG. 2 is a side view of the attachment assembly of the present invention.
Figure 4:
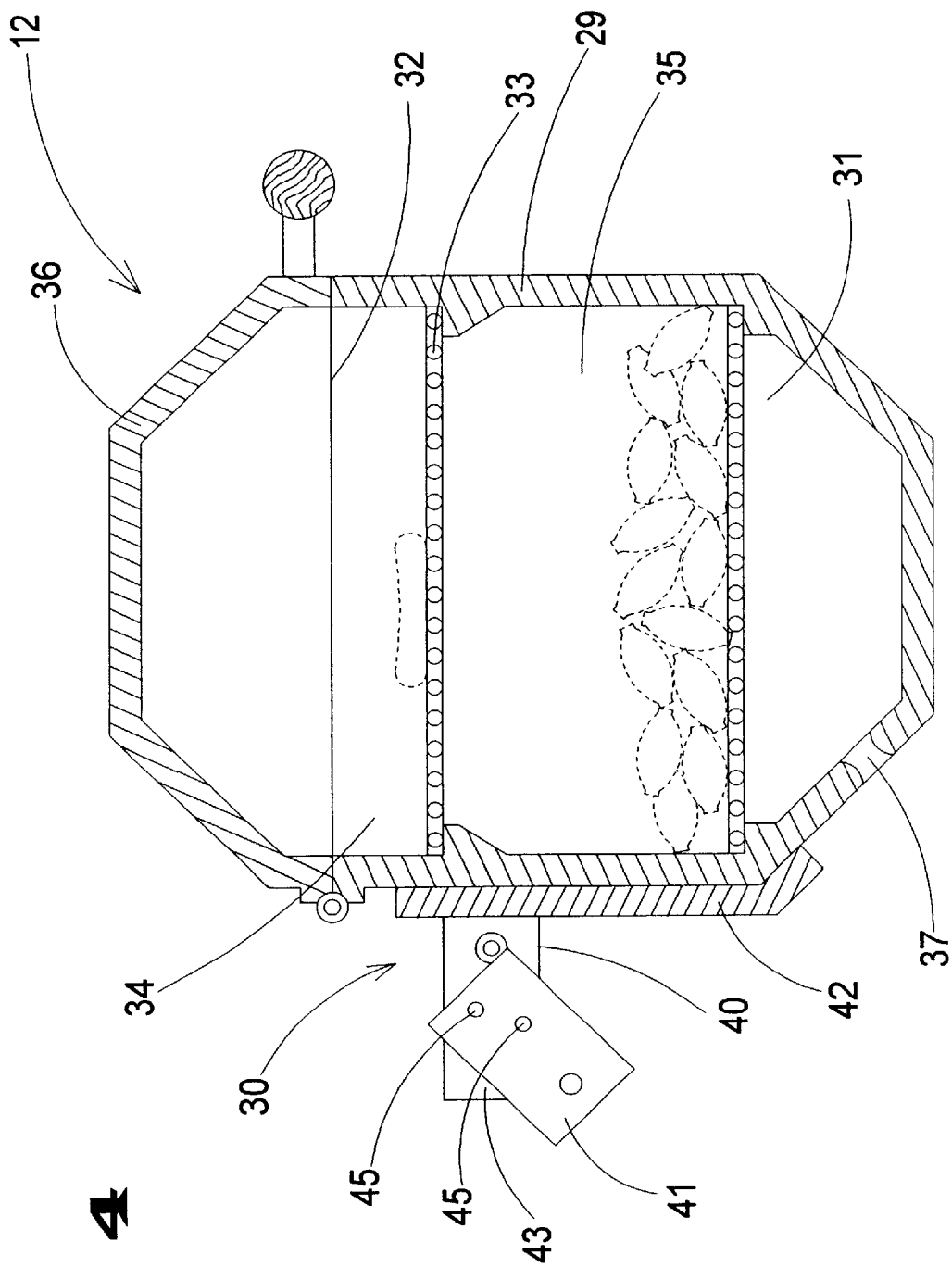
FIG. 4 is a cross-sectional view of the accessory assembly of the present invention as taken along line 4—4 of FIG. 1 with charcoal briquettes for the heat source.
Figure 5:
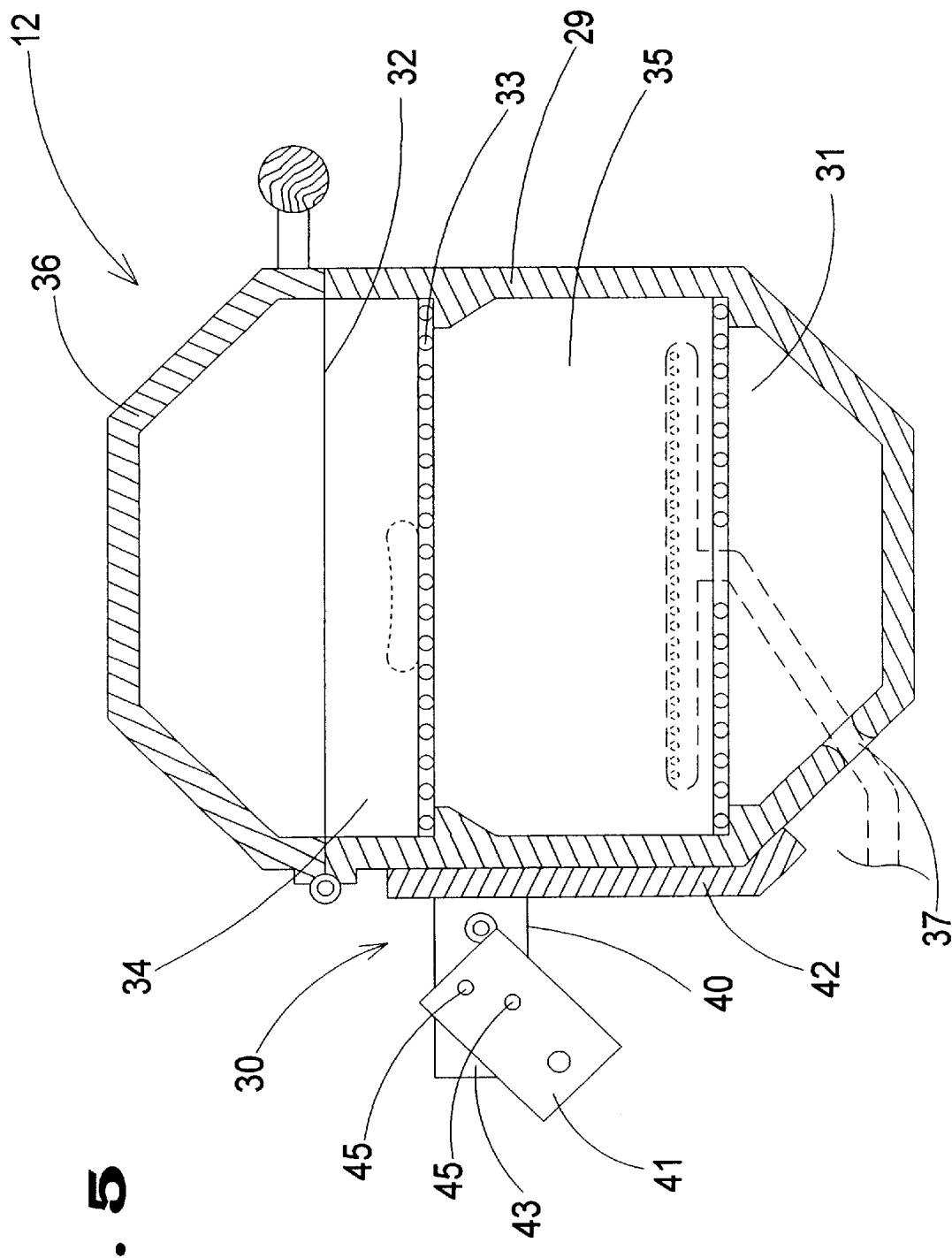
FIG. 5 is a cross-sectional view of the accessory assembly of the present invention with a burner for the heat source.

With reference now to the drawings, and in particular to FIGS. 1 through 7 thereof, a new the grill and vehicle attachement embodying the principles and concepts of the present invention and generally designated by the reference numeral 10 will be described.

As best illustrated in FIGS. 1 through 7, the the grill and vehicle attachement 10 generally comprises an attachment assembly 11 being designed for being coupled to a vehicle.

An accessory assembly 12 is selectively coupled to the attachment assembly 11. The attachment assembly 11 permits selective positioning of the accessory assembly 12 with respect to the vehicle whereby the accessory assembly 12 is usable by a user.

The attachment assembly 11 comprises a base portion 13 and an arm portion 14. The arm portion 14 is pivotally coupled to the base portion 13. The base portion 13 is designed for being selectively coupled to the vehicle. The arm portion 14 is pivotally coupled to the accessory assembly 12 whereby the arm portion 14 is selectively pivotal with respect to the base portion 13 for positioning the accessory assembly 12 with respect to the vehicle.

The attachment assembly 11 comprises a securing pin 15. The base portion 13 is designed for being inserted into a hitch receiver of the vehicle. The securing pin 15 is designed for being selectively inserted through the hitch receiver and a securing aperture 16 through the base portion 13 for selectively securing the base portion 13 to the vehicle.

The arm portion 14 comprises a sleeve member 17 and an extension member 18. The sleeve member 17 slidably receives the extension member 18 whereby a length of the arm portion 14 is selectively adjustable. The sleeve member 17 is pivotally coupled to the base portion 13. The extension member 18 is coupled to the accessory assembly 12 whereby a height of the accessory assembly 12 is adjustable with respect to the base portion 13.

The arm portion 14 comprises an adjustment pin 19. The extension member 18 comprises a plurality of height apertures 20 extending through the extension member 18. The sleeve member 17 comprises an alignment aperture 21 extending through the sleeve member 17 whereby the alignment aperture 21 of the sleeve member 17 is selectively alignable with one of the height apertures 20 of the extension member 18 when the extension member 18 is slidably adjusted with respect to the sleeve member 17. The adjustment pin 19 is selectively insertable through the alignment aperture 21 and one of the height apertures 20 for securing the extension member 18 to the sleeve member 17 when one of the height apertures 20 is aligned with the alignment aperture 21. The attachment assembly 11 comprises a tightening rod 22 threadably coupled to the sleeve member 17 of the arm portion 14. The tightening rod 22 selectively engages the extension member 18 and presses the extension member 18 against the sleeve member 17 and the adjustment pin 19 for inhibiting the extension member 18 from rattling against the sleeve member 17.

The attachment assembly 11 comprises a first hinge portion 23 and a second hinge portion 24. The first hinge portion 23 is coupled to the base portion 13. The second hinge portion 24 is coupled to the arm portion 14. A pivot pin of the attachment assembly 11 pivotally couples the first hinge portion 23 to the second hinge portion 24 for permitting the arm portion 14 to pivot with respect to the base portion 13.

The attachment assembly 11 comprises a pair of alignment plates 25. Each of the alignment plates 25 is couple to the base portion 13 whereby the arm portion 14 is positioned between the alignment plates 25 when the arm portion 14 is pivotally coupled to the base portion 13 for maintaining alignment of the arm portion 14 with the base portion 13.

Each of the alignment plates 25 of the attachment assembly 11 comprises a retaining aperture 26. The arm portion 14 comprises a receiving aperture 27 whereby the receiving aperture 27 is selectively aligned with the retaining aperture 26 of the alignment plates 25 when the arm portion 14 is positioned substantially orthogonally to the base portion 13. A retaining pin 28 of the attachment assembly 11 is selectively extended through the retaining aperture 26 of each of the alignment plates 25 and the receiving aperture 27 of the arm portion 14 when the receiving aperture 27 of the arm portion 14 is aligned with the retaining aperture 26 of the alignment plates 25 for securing the arm portion 14 substantially orthogonally positioned to the base portion 13.

The accessory assembly 12 comprises a perimeter wall 29. The accessory assembly 12 comprises a mounting assembly 30. The mounting assembly 30 is coupled to the perimeter wall 29 of the accessory assembly 12. The mounting assembly 30 selectively couples to the attachment assembly 11 for securing the accessory assembly 12 to the attachment assembly 11.

The perimeter wall 29 of the accessory assembly 12 defines an interior space 31 of the accessory assembly 12. The interior space 31 of the accessory assembly 12 comprises an open upper end 32 for permitting insertion of objects into the interior space 31 of the accessory assembly 12.

The accessory assembly 12 comprises at least one grate member 33. The grate member 33 is selectively insertable into the interior space 31 of the accessory assembly 12 whereby the grate member 33 divides the interior space 31 into an upper space 34 and a lower space 35 of the interior space 31 of the accessory assembly 12. The lower space 35 of the interior space 31 is designed for receiving a heat source. The upper space 34 of the interior space 31 is designed for receiving a food product to be positioned on the grate member 33 whereby the food is cooked by the heat source positioned in the lower space 35 of the interior space 31 of the accessory assembly 12.

The accessory assembly 12 comprises a lid member 36. The lid member 36 is selectively couplable to the perimeter wall 29 of the accessory assembly 12. The lid member 36 is selectively positionable over the open end of the interior space 31 for closing the open end of the interior space 31 whereby the lid member 36 is designed for inhibiting loss of heat provided by the heat source from the interior space 31 of the accessory assembly 12 when the food is being cooked.

The perimeter wall 29 of the accessory assembly 12 comprises a plurality of supply apertures 37 extending through the perimeter wall 29. The supply apertures 37 are designed for permitting a consumable fuel to be supplied to the heat source to be consumed by the heat source to produce heat to cook the food. The heat source may comprise of plurality of charcoal briquettes or a burner. In the case of the charcoal briquettes, the supply apertures 37 allow air to enter into the interior space 31 to provide fuel for the smoldering charcoal briquettes so that the charcoal briquettes continue to smolder. In the case of the burner, gas lines are extend into the interior space 31 through the supply apertures 37 to provide fuel to the burner to allow the fuel to be burned to provide heat for cooking the food.

The accessory assembly 12 comprises a damper plate 38. The damper plate 38 comprises a plurality of damper apertures 39 extending thorough the damper plate 38. The damper plate 38 is slidably coupled to the perimeter wall 29 adjacent the supply apertures 37 whereby the damper plate 38 is selectively slidable with respect to the supply apertures 37 for selectively aligning the damper apertures 39 with the supply apertures 37 for controlling the flow of the consumable fuel to the heat source. The damper plate 38 is to be used when the heat source is charcoal briquettes so that sliding of the damper plate 38 control the flow of air into the interior space 31 to be consumed by the smoldering briquettes.

The mounting assembly 30 of the accessory assembly 12 comprises a mounting portion 40 and a positioning portion 41. The mounting portion 40 is coupled to the perimeter wall 29 of the accessory assembly 12. The positioning portion 41 is pivotally coupled to the mounting portion 40. The positioning portion 41 is selectively coupled to the extension member 18 of the attachment assembly 11 for permitting the accessory assembly 12 to be positioned at an angle to the attachment assembly 11.

The mounting portion 40 comprises a mounting plate 42 and pair of securing plates 43. The mounting plate 42 is coupled to the perimeter wall 29 of the accessory assembly 12. The securing plates 43 are coupled to the mounting plate 42 whereby the positioning portion 41 is positioned between the securing plates 43 for maintaining alignment of the securing portion with the mounting plate 42 when the securing portion is pivoted with respect to the mounting plate 42.

Each of the securing plates 43 of the mounting assembly 30 comprises a plurality of mounting apertures 44. The securing portion of the mounting assembly 30 comprises a fixture aperture 45 whereby the fixture aperture 45 is selectively alignable with one of the mounting apertures 44 of each of the securing plates 43 when the securing portion of pivoted with respect to the mounting plate 42. An accessory pin 46 of the accessory assembly 12 is selectively insertable through one of the mounting apertures 44 of each of the securing plates 43 and the fixture aperture 45 of the securing portion when the fixture aperture 45 is aligned the associated one of the mounting apertures 44 of each of the securing plates 43 for securing the mounting plate 42s at a desired angle to the securing portion.

Figure 6:
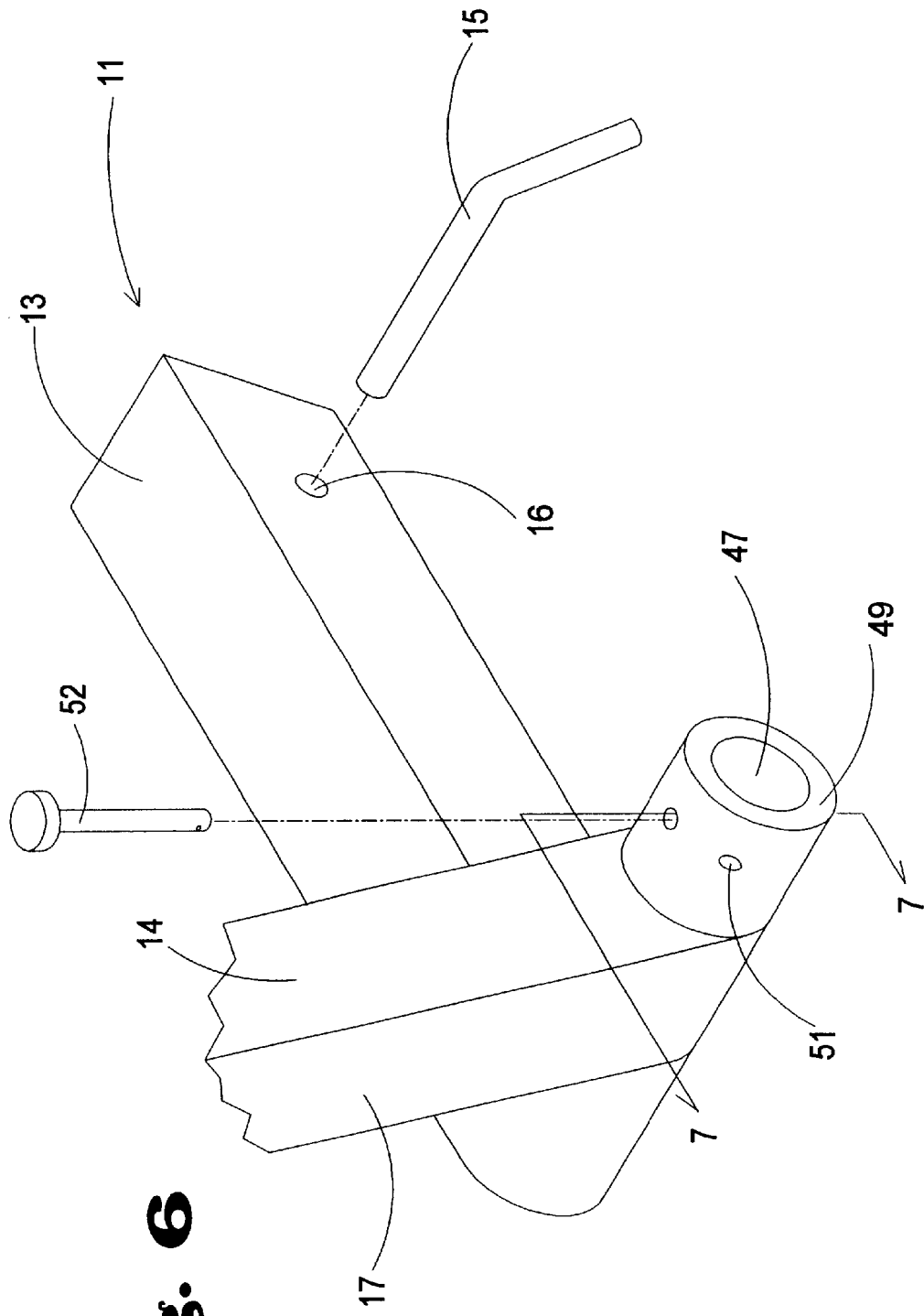
FIG. 6 is a perspective view of an alternate embodiment of the attachment assembly of the present invention.
Figure 7:
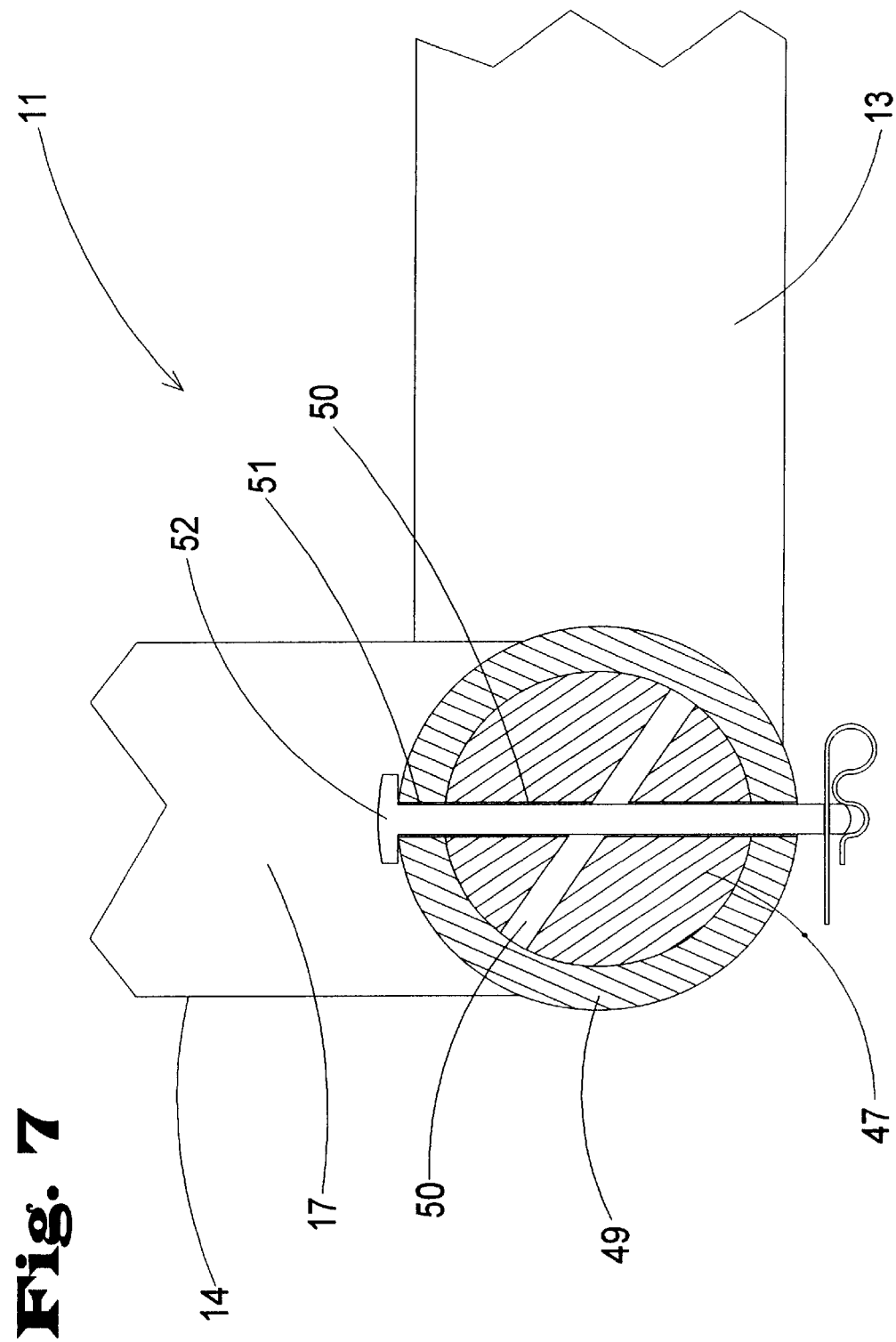
FIG. 7 is a cross-sectional view of the present invention taken along line 7—7 of FIG. 6.

In an embodiment, as shown in FIGS. 6 and 7, the attachment assembly 11 comprises an axle member 47 and an axle sleeve 49. The axle member 47 is coupled to the base portion 13. The axle sleeve 49 is coupled to the arm portion 14 whereby the axle sleeve 49 is slidably positioned around the axle member 47 whereby the axle sleeve 49 is rotatable around the axle member 47 for permitting angular positioning of the arm portion 14 with respect to the base portion 13. The axle member 47 of the attachment assembly 11 comprises a plurality of angle apertures 50 extending through the axle member 47. The axle sleeve 49 of the attachment assembly 11 comprises a locking aperture 51 extending through the axle sleeve 49 whereby the locking aperture 51 is selectively alignable with one of the angle apertures 50 of the axle member 47 when the axle sleeve 49 is rotated with respect to the axle member 47. A locking pin 52 of the attachment assembly 11 is selectively insertable through the locking aperture 51 of the axle sleeve 49 and one of the angle apertures 50 of the axle member 47 for securing the arm portion 14 to the base portion 13 at a desired angle.

In use, the user inserts the base portion 13 of the attachment assembly 11 into the receiver of the vehicle. The securing pin 15 is then extended through the receiver and the base portion 13 to secure the attachment assembly 11 to the vehicle. The arm portion 14 is then positioned between the alignment plates 25 and the second hinge portion 24 is aligned with the second hinge portion 24 and the pivot pin is inserted through the first hinge portion 23 and the second hinge portion 24 to allow the arm portion 14 to pivot with respect to the base portion 13. The sleeve member 17 of the arm portion 14 is positioned at the desired angle. When the sleeve member 17 is positioned at 135 degrees to the base portion 13 the sleeve member 17 abuts the base portion 13 which prevents the sleeve member 17 from pivoting beyond 135 degrees with respect to the base portion 13. When the sleeve member 17 is positioned at 90 degrees with respect to the base portion 13 the retaining pin 28 is inserted through the retaining aperture 26 of the alignment plates 25 and the receiving aperture 27 of the sleeve member 17 to secure the sleeve member 17 orthogonally positioned with respect to the base portion 13. The extension member 18 is then inserted into the sleeve member 17 and the adjustment pin 19 is inserted through the alignment aperture 21 and one of the height apertures 20 of the extension member 18 to set the desired length of the arm portion 14. The positioning portion 41 of the accessory assembly 12 is then coupled to the extension member 18 and the accessory pin 46 is inserted through one of the mounting apertures 44 of the securing plates 43 and the fixture aperture 45 of the positioning portion 41 to secure to accessory assembly 12 at the desired angle. The user can then pivot the lid member 36 to access the interior space 31 of the accessory assembly 12 to cook food.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system comprising:

an attachment assembly being adapted for being coupled to a vehicle;

an accessory assembly being selectively coupled to said attachment assembly, said attachment assembly permitting selective positioning of said accessory assembly with respect to the vehicle such that said accessory assembly is usable by a user;

said accessory assembly comprising a perimeter wall, said accessory assembly comprising a mounting assembly, said mounting assembly being coupled to said perimeter wall of said accessory assembly, said mounting assembly selectively coupling to said attachment assembly for securing said accessory assembly to said attachment assembly;

said perimeter wall of said accessory assembly defining an interior space of said accessory assembly, said interior space of said accessory assembly comprising an open upper end for permitting insertion of objects into said interior space of said accessory assembly;

said accessory assembly comprising at least one grate member, said grate member being selectively insertable into said interior space of said accessory assembly such that said grate member divides said interior space into an upper space and a lower space of said interior space of said accessory assembly, said lower space of said interior space being adapted for receiving a heat source, said upper space of said interior space being adapted for receiving a food product to be positioned on said grate member such that the food is cooked by the heat source positioned in said lower space of said interior space of said accessory assembly;

said perimeter wall of said accessory assembly comprising a plurality of supply apertures extending through said perimeter wall, said supply apertures being adapted for permitting a consumable fuel to be supplied to the heat source to be consumed by the heat source to produce heat to cook the food; and said accessory assembly comprising a damper plate, said damper plate comprising a plurality of damper apertures extending thorough said damper plate, said damper plate being slidably coupled to said perimeter wall adjacent said supply apertures such that said damper plate is selectively slidable with respect to said supply apertures for selectively aligning said damper apertures with said supply apertures for controlling the flow of the consumable fuel to the heat source.

2. The system as set forth in claim 1, further comprising:

said attachment assembly comprising a base portion and an arm portion, said arm portion being pivotally coupled to said base portion, said base portion being adapted for being selectively coupled to the vehicle, said arm portion being pivotally coupled to said accessory assembly such that said arm portion is selectively pivotal with respect to said base portion for positioning said accessory assembly with respect to the vehicle.

3. The system as set forth in claim 2, further comprising:

said attachment assembly comprising a securing pin, said base portion being adapted for being inserted into a hitch receiver of the vehicle, said securing pin being adapted for being selectively inserted through the hitch receiver and a securing aperture through said base portion for selectively securing said base portion to the vehicle.

4. The system as set forth in claim 2, further comprising:

said arm portion comprising a sleeve member and an extension member, said sleeve member slidably receiving said extension member such that a length of said arm portion is selectively adjustable, said sleeve member being pivotally coupled to said base portion, said extension member being coupled to said accessory assembly such that a height of said accessory assembly is adjustable with respect to said base portion.

5. The system as set forth in claim 4, further comprising:

said arm portion comprising an adjustment pin, said extension member comprising a plurality of height apertures extending through said extension member, said sleeve member comprising an alignment aperture extending through said sleeve member such that said alignment aperture of said sleeve member is selectively alignable with one of said height apertures of said extension member when said extension member is slidably adjusted with respect to said sleeve member, said adjustment pin being selectively insertable through said alignment aperture and one of said height apertures for securing said extension member to said sleeve member when one of said height apertures is aligned with said alignment aperture.

6. The system as set forth in claim 2, further comprising:

said attachment assembly comprising a first hinge portion and a second hinge portion, said first hinge portion being coupled to said base portion, said second hinge portion being coupled to said arm portion, a pivot pin of said attachment assembly pivotally coupling said first hinge portion to said second hinge portion for permitting said arm portion to pivot with respect to said base portion.

7. The system as set forth in claim 2, further comprising:

said attachment assembly comprising a pair of alignment plates, each of said alignment plates being couple to said base portion such that said arm portion is positioned between said alignment plates when said arm portion is pivotally coupled to said base portion for maintaining alignment of said arm portion with said base portion.

8. The system as set forth in claim 7, further comprising:

each of said alignment plates of said attachment assembly comprising a retaining aperture, said arm portion comprising a receiving aperture such that said receiving aperture is selectively aligned with said retaining aperture of said alignment plates when said arm portion is positioned substantially orthogonally to said base portion, a retaining pin of said attachment assembly being selectively extended through said retaining aperture of each of said alignment plates and said receiving aperture of said arm portion when said receiving aperture of said arm portion is aligned with said retaining aperture of said alignment plates for securing said arm portion substantially orthogonally positioned to said base portion.

9. The system as set forth in claim 2, further comprising:

said attachment assembly comprising an axle member and an axle sleeve, said axle member being coupled to said base portion, said axle sleeve being coupled to said arm portion such that said axle sleeve is slidably positioned around said axle member such that said axle sleeve is rotatable around said axle member for permitting angular positioning of said arm portion with respect to said base portion.

10. The system as set forth in claim 9, further comprising:

said axle member of said attachment assembly comprising a plurality of angle apertures extending through said axle member, said axle sleeve of said, attachment assembly comprising a locking aperture extending through said axle sleeve such that said locking aperture is selectively alignable with one of said angle apertures of said axle member when said axle sleeve is rotated with respect to said axle member, a locking pin of said attachment assembly being selectively insertable through said locking aperture of said axle sleeve and one of said angle apertures of said axle member for securing said arm portion to said base portion at a desired angle.

11. The system as set forth in claim 1, further comprising:

said accessory assembly comprising a lid member, said lid member being selectively couplable to said perimeter wall of said accessory assembly, said lid member being selectively positionable over said open end of said interior space for closing said open end of said interior space such that said lid member is adapted for inhibiting loss of heat provided by the heat source from said interior space of said accessory assembly when the food is being cooked.

12. The system as set forth in claim 1, further comprising:

said mounting assembly of said accessory assembly comprising a mounting portion and a positioning portion, said mounting portion being coupled to said perimeter wall of said accessory assembly, said positioning portion being pivotally coupled to said mounting portion, said positioning portion being selectively coupled to said attachment assembly for permitting said accessory assembly to be positioned at an angle to said attachment assembly.

13. The system as set forth in claim 12, further comprising:

said mounting portion comprising a mounting plate and pair of securing plates, said mounting plate being coupled to said perimeter wall of said accessory assembly, said securing plates being coupled to said mounting plate such that said positioning portion is positioned between said securing plates for maintaining alignment of said securing portion with said mounting plate when said securing portion is pivoted with respect to said mounting plate.

14. The system as set forth in claim 13, further comprising:

each of said securing plates of said mounting assembly comprising a plurality of mounting apertures, said securing portion of said mounting assembly comprising a fixture aperture such that said fixture aperture is selectively alignable with one of said mounting apertures of each of said securing plates when said securing portion of pivoted with respect to said mounting plate, an accessory pin of said accessory assembly being selectively insertable through one of said mounting apertures of each of said securing plates and said fixture aperture of said securing portion when said fixture aperture is aligned the associated one of said mounting apertures of each of said securing plates for securing said mounting plates at a desired angle to said securing portion.

15. A system comprising:

an attachment assembly being adapted for being coupled to a vehicle;

an accessory assembly being selectively coupled to said attachment assembly, said attachment assembly permitting selective positioning of said accessory assembly with respect to the vehicle such that said accessory assembly is usable by a user;

said attachment assembly comprising a base portion and an arm portion, said arm portion being pivotally coupled to said base portion, said base portion being adapted for being selectively coupled to the vehicle, said arm portion being pivotally coupled to said accessory assembly such that said arm portion is selectively pivotal with respect to said base portion for positioning said accessory assembly with respect to the vehicle;

said attachment assembly comprising a securing pin, said base portion being adapted for being inserted into a hitch receiver of the vehicle, said securing pin being adapted for being selectively inserted through the hitch receiver and a securing aperture through said base portion for selectively securing said base portion to the vehicle;

said arm portion comprising a sleeve member and an extension member, said sleeve member slidably receiving said extension member such that a length of said arm portion is selectively adjustable, said sleeve member being pivotally coupled to said base portion, said extension member being coupled to said accessory assembly such that a height of said accessory assembly is adjustable with respect to said base portion;

said arm portion comprising an adjustment pin, said extension member comprising a plurality of height apertures extending through said extension member, said sleeve member comprising an alignment aperture extending through said sleeve member such that said alignment aperture of said sleeve member is selectively alignable with one of said height apertures of said extension member when said extension member is slidably adjusted with respect to said sleeve member, said adjustment pin being selectively insertable through said alignment aperture and one of said height apertures for securing said extension member to said sleeve member when one of said height apertures is aligned with said alignment aperture;

said attachment assembly comprising a first hinge portion and a second hinge portion, said first hinge portion being coupled to said base portion, said second hinge portion being coupled to said arm portion, a pivot pin of said attachment assembly pivotally coupling said first hinge portion to said second hinge portion for permitting said arm portion to pivot with respect to said base portion;

said attachment assembly comprising a pair of alignment plates, each of said alignment plates being couple to said base portion such that said arm portion is positioned between said alignment plates when said arm portion is pivotally coupled to said base portion for maintaining alignment of said arm portion with said base portion;

each of said alignment plates of said attachment assembly comprising a retaining aperture, said arm portion comprising a receiving aperture such that said receiving aperture is selectively aligned with said retaining aperture of said alignment plates when said arm portion is positioned substantially orthogonally to said base portion, a retaining pin of said attachment assembly being selectively extended through said retaining aperture of each of said alignment plates and said receiving aperture of said arm portion when said receiving aperture of said arm portion is aligned with said retaining aperture of said alignment plates for securing said arm portion substantially orthogonally positioned to said base portion;

said accessory assembly comprising a perimeter wall, said accessory assembly comprising a mounting assembly, said mounting assembly being coupled to said perimeter wall of said accessory assembly, said mounting assembly selectively coupling to said attachment assembly for securing said accessory assembly to said attachment assembly;

said perimeter wall of said accessory assembly defining an interior space of said accessory assembly, said interior space of said accessory assembly comprising an open upper end for permitting insertion of objects into said interior space of said accessory assembly;

said accessory assembly comprising at least one grate member, said grate member being selectively insertable into said interior space of said accessory assembly such that said grate member divides said interior space into an upper space and a lower space of said interior space of said accessory assembly, said lower space of said interior space being adapted for receiving a heat source, said upper space of said interior space being adapted for receiving a food product to be positioned on said grate member such that the food is cooked by the heat source positioned in said lower space of said interior space of said accessory assembly;

said accessory assembly comprising a lid member, said lid member being selectively couplable to said perimeter wall of said accessory assembly, said lid member being selectively positionable over said open end of said interior space for closing said open end of said interior space such that said lid member is adapted for inhibiting loss of heat provided by the heat source from said interior space of said accessory assembly when the food is being cooked;

said perimeter wall of said accessory assembly comprising a plurality of supply apertures extending through said perimeter wall, said supply apertures being adapted for permitting a consumable fuel to be supplied to the heat source to be consumed by the heat source to produce heat to cook the food;

said accessory assembly comprising a damper plate, said damper plate comprising a plurality of damper apertures extending thorough said damper plate, said damper plate being slidably coupled to said perimeter wall adjacent said supply apertures such that said damper plate is selectively slidable with respect to said supply apertures for selectively aligning said damper apertures with said supply apertures for controlling the flow of the consumable fuel to the heat source;

said mounting assembly of said accessory assembly comprising a mounting portion and a positioning portion, said mounting portion being coupled to said perimeter wall of said accessory assembly, said positioning portion being pivotally coupled to said mounting portion, said positioning portion being selectively coupled to said extension member of said attachment assembly for permitting said accessory assembly to be positioned at an angle to said attachment assembly;

said mounting portion comprising a mounting plate and pair of securing plates, said mounting plate being coupled to said perimeter wall of said accessory assembly, said securing plates being coupled to said mounting plate such that said positioning portion is positioned between said securing plates for maintaining alignment of said securing portion with said mounting plate when said securing portion is pivoted with respect to said mounting plate; and each of said securing plates of said mounting assembly comprising a plurality of mounting apertures, said securing portion of said mounting assembly comprising a fixture aperture such that said fixture aperture is selectively alignable with one of said mounting apertures of each of said securing plates when said securing portion of pivoted with respect to said mounting plate, an accessory pin of said accessory assembly being selectively insertable through one of said mounting apertures of each of said securing plates and said fixture aperture of said securing portion when said fixture aperture is aligned the associated one of said mounting apertures of each of said securing plates for securing said mounting plates at a desired angle to said securing portion.

16. A system comprising:

an attachment assembly being adapted for being coupled to a vehicle;

an accessory assembly being selectively coupled to said attachment assembly, said attachment assembly permitting selective positioning of said accessory assembly with respect to the vehicle such that said accessory assembly is usable by a user;

said accessory assembly comprising a perimeter wall, said accessory assembly comprising a mounting assembly, said mounting assembly being coupled to said perimeter wall of said accessory assembly, said mounting assembly selectively coupling to said attachment assembly for securing said accessory assembly to said attachment assembly;

said perimeter wall of said accessory assembly defining an interior space of said accessory assembly, said interior space of said accessory assembly comprising an open upper end for permitting insertion of objects into said interior space of said accessory assembly;

said accessory assembly comprising at least one grate member, said grate member being selectively insertable into said interior space of said accessory assembly such that said grate member divides said interior space into an upper space and a lower space of said interior space of said accessory assembly, said lower space of said interior space being adapted for receiving a heat source, said upper space of said interior space being adapted for receiving a food product to be positioned on said grate member such that the food is cooked by the heat source positioned in said lower space of said interior space of said accessory assembly;

said mounting assembly of said accessory assembly comprising a mounting portion and a positioning portion, said mounting portion being coupled to said perimeter wall of said accessory assembly, said positioning portion being pivotally coupled to said mounting portion, said positioning portion being selectively coupled to said attachment assembly for permitting said accessory assembly to be positioned at an angle to said attachment assembly; and said mounting portion comprising a mounting plate and pair of securing plates, said mounting plate being coupled to said perimeter wall of said accessory assembly, said securing plates being coupled to said mounting plate such that said positioning portion is positioned between said securing plates for maintaining alignment of said securing portion with said mounting plate when said securing portion is pivoted with respect to said mounting plate.

17. The system as set forth in claim 15, further comprising:

said accessory assembly comprising a lid member, said lid member being selectively couplable to said perimeter wall of said accessory assembly, said lid member being selectively positionable over said open end of said interior space for closing said open end of said interior space such that said lid member is adapted for inhibiting loss of heat provided by the heat source from said interior space of said accessory assembly when the food is being cooked.

18. The system as set forth in claim 16, further comprising:

each of said securing plates of said mounting assembly comprising a plurality of mounting apertures, said securing portion of said mounting assembly comprising a fixture aperture such that said fixture aperture is selectively alignable with one of said mounting apertures of each of said securing plates when said securing portion of pivoted with respect to said mounting plate, an accessory pin of said accessory assembly being selectively insertable through one of said mounting apertures of each of said securing plates and said fixture aperture of said securing portion when said fixture aperture is aligned the associated one of said mounting apertures of each of said securing plates for securing said mounting plates at a desired angle to said securing portion.

* * * * *